Dec. 17, 1968

A. W. PARR 3,416,568

CROSSOVER FAUCET

Filed Nov. 29, 1965

ALBERT W. PARR
INVENTOR

BY
BUCKHORN, BLORE, KLARQUIST & SPARKMAN
ATTORNEYS

Dec. 17, 1968          A. W. PARR          3,416,568

CROSSOVER FAUCET

Filed Nov. 29, 1965          2 Sheets-Sheet 2

ALBERT W. PARR
INVENTOR

BY
BUCKHORN, BLORE, KLARQUIST & SPARKMAN
ATTORNEYS

United States Patent Office 3,416,568
Patented Dec. 17, 1968

3,416,568
CROSSOVER FAUCET
Albert W. Parr, 4700 Meldrum Ave.,
Milwaukie, Oreg. 97222
Filed Nov. 29, 1965, Ser. No. 510,222
9 Claims. (Cl. 137—606)

ABSTRACT OF THE DISCLOSURE

A faucet fixture for receiving hot and cold water is supported on a base which is in turn mounted on a sink or the like. The base includes therewith a pair of fluid passages and a pair of laterally spaced inlet ports wherein the fluid passages each extend from one such inlet port to an inlet opening in the faucet fixture. In so doing, the fluid passages cross over one another to reverse the apparent source of fluid supply. In one embodiment, this base is a unitary body having interior passages, and in another embodiment the base comprises a pair of flat stacked lateral arms mutually supporting each other and supporting the faucet fixture.

---

The present invention relates to a crossover faucet device for plumbing fixtures and more particularly to such a device for mounting substantially integrally with a faucet fixture.

Often in buildings where there are two or more lavatories or other rooms on one floor each requiring hot and cold water faucets, such rooms adjoin one another, and the hot and cold water fixtures of each room are situated back-to-back on opposite sides of a common wall. In such instances a single pair of vertical hot and cold water riser pipes within the wall usually supply both faucet fixtures. Better plumbing practice requires that the hot and cold water control handles of each plumbing fixture always be on the same relative side of the sink or other receptacle, that is, the hot water handle should be on the left and the cold water handle on the right side thereof. However, when two back-to-back faucet fixtures are supplied by common riser pipes, between the fixtures, one of the fixtures will have the hot and cold water supplied to it on the wrong side thereof unless the crossover connection is provided in the line somewhere between the faucet fixture and the riser supply pipes.

It is common practice for the plumber to fashion such a crossover connection within the wall between the faucets during initial installation of the plumbing, using standard pipe and pipe coupling. Obviously this is laborious and time-consuming and the crossover connection usually must be made during initial stages of construction of the building in order to prevent tearing out sections of the partition wall. Moreover, when repairs are required, a portion of the finished wall must be torn away to gain access to the connection.

In my copending application Ser. No. 419,735, now Patent No. 3,349,797, filed Dec. 21, 1964, and entitled "Hot and Cold Water Crossover Fitting," a crossover device is set forth and claimed which alleviates many of the problems of the prior art. This crossover device includes a pair of crossover tubes connected between cylindrical body members mounted in the water supply pipes to a sink, lavatory or other receptacle. For example, the crossover device according to my prior invention is conveniently located immediately under a sink or lavatory in a straightforward manner such that plumbing labor is substantially reduced. The fitting is also conveniently accessible for future changes or repairs. However, the device according to my prior invention does involve the installation of a plumbing fixture underneath the sink in addition to the usual faucet fixture mounted on the sink.

It is accordingly a primary object of the present invention to provide a new and improved crossover faucet device mounted in substantially integral relation with a faucet fixture on a sink or other receptacle.

It is another object of the present invention to provide a new and improved crossover device for mounting in conjunction with a faucet fixture on a sink or other receptacle, wherein such crossover device is above the sink or receptacle on the same side of the sink as the faucet fixture providing support for the faucet fixture and in turn supported upon such sink or receptacle.

It is a further object of the present invention to provide a crossover device integrally attached to a faucet fixture whereby such crossover device and faucet fixture may be mounted on a sink or receptacle and attached to water connections in substantially one plumbing operation.

In furtherance of the above objects, a crossover device in accordance with the present invention comprises a supporting base for a faucet fixture, located immediately adjacent the faucet fixture wherein the said base includes a pair of cross-connected fluid passages therein. In accordance with a first embodiment of the present invention, the base takes the form of a pair of stacked lateral arms supporting the faucet fixture, each arm being recessed to provide a fluid passage. Each arm extends from a water inlet port, past and above the other lateral arm, towards an oppositely positioned inlet opening on the opposite side of the faucet fixture, thereby providing a cross-connection for fluids passing to the faucet fixture.

In accordance with a second embodiment of the present invention, a supporting base is substantially integral with the faucet fixture, and provided with interior passages extending from inlet ports in the said base to oppositely positioned inlet openings in the faucet fixture. These passages cross one another within the base in a side by side relation. According to a feature of the invention, the said passages take the form of a pair of recesses having a substantially vertical wall therebetween and further openings connecting the recesses to proper inlet ports in the base as well as proper inlet openings in the faucet fixture. The vertical wall separating the recesses preferably includes a bore receiving a drain plug actuating rod attached to the said faucet fixture. The completed faucet fixture and base may be mounted upon a sink in one plumbing operation in the same manner and in the same time as a conventional plumbing fixture alone.

The subject matter which I regard as my invention is particularly pointed out and distinctly claimed in the concluding portion of this specification. The invention, however, both as to organization and method of operation, together with further advantages and objects thereof, may be best understood by reference to the following description taken in connection with the accompanying drawings wherein like reference characters refer to like elements and in which:

Figure 8:
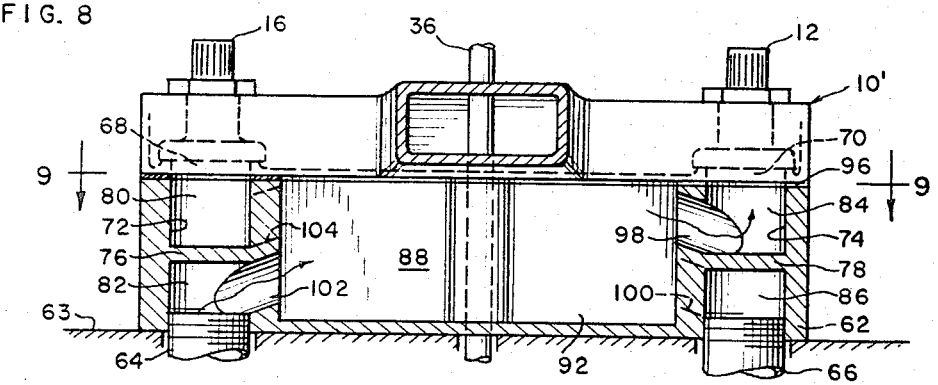

FIG. 8 has a cross-section of a second embodiment of the present invention, and

Figure 7:
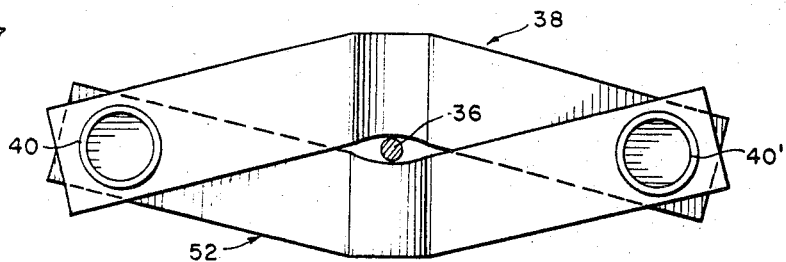
FIG. 7 illustrates the first and second lateral arms in assembled relation.
Figure 9:
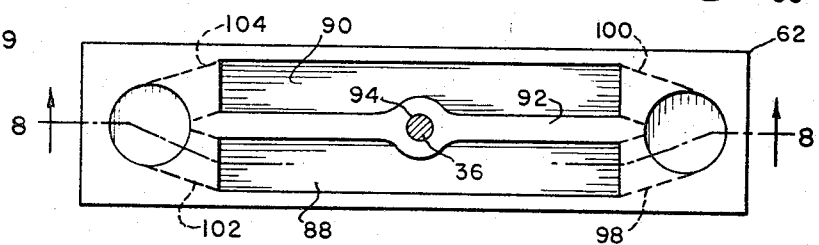

FIG. 9 is a cross-section of the FIG. 7 embodiment taken at 8—8 in FIG. 7.

Figure 1:
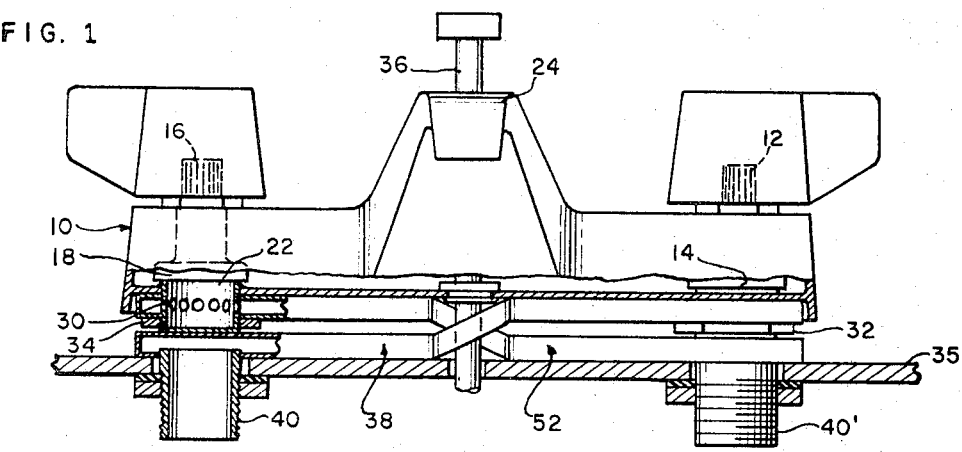
FIG. 1 is a cross-sectional view of a first embodiment of a crossover faucet device according to the present invention.

Referring to FIGS. 1 through 7, and particularly FIG. 1, the crossover device in accordance with the present invention is here employed in conjunction with a faucet fixture 10 of the variety utilized in sinks, lavatories, washbasins and other receptacles, and conventionally mounted on the upper rear thereof. The faucet fixture includes a spline 12 for a hot water valve handle which operates a valve illustrated schematically at 14, and a spline 16 for mounting a cold water handle for operating valve 18. Valve 14 opens and closes an inlet opening 20 while valve 18 opens and closes an inlet opening 22 on the underside of faucet fixture 10. These laterally spaced inlet openings communicate within fixture 10 to a common output nozzle 24 in the conventional manner. Of course, if desired, a faucet fixture may be employed having separate hot and cold output nozzles, in which case each of valves 14 and 18 control the flow of water through one of such individual nozzles.

The inlet openings of fixture 10 are illustrated more fully in FIG. 2 and may conveniently comprise a pair of short conduits 25 and 26, communicating to valves 14 and 18 within the faucet fixture, and having a series of holes 28 and 30 immediately below the faucet fixture. Conduits 25 and 26 are plugged at their lower end and are also conveniently threaded to receive nuts 32 and 34 respectively. These nuts are shown in place in FIG. 1. Drain plug rod 36 extends through the body of the faucet fixture 10 in the conventional manner.

Figure 3:
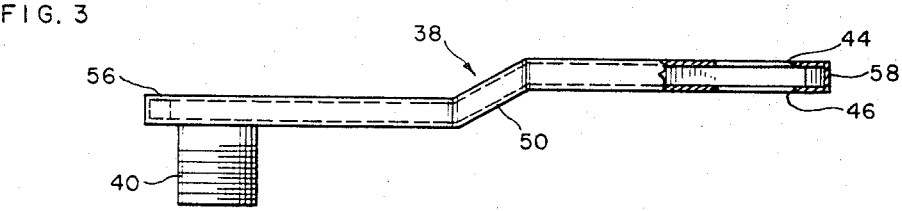
FIGS. 3 and 4 illustrate a first lateral arm comprising a part of a crossover device in accordance with the first embodiment of the present invention.
Figure 4:
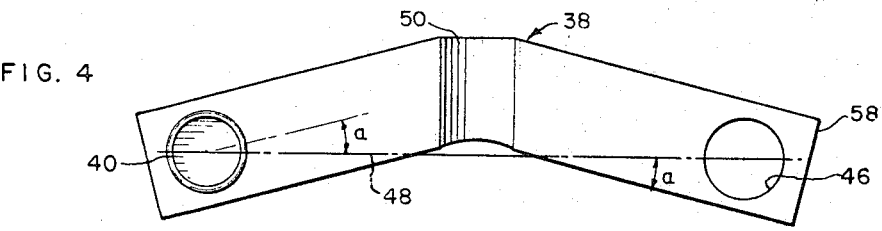
Figure 5:
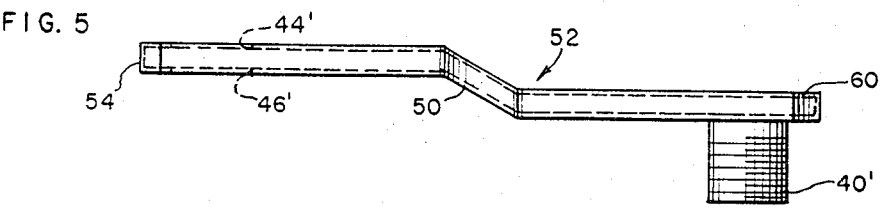
FIGS. 5 and 6 illustrate a second lateral arm comprising a part of the crossover device according to the same embodiment of the present invention.
Figure 6:
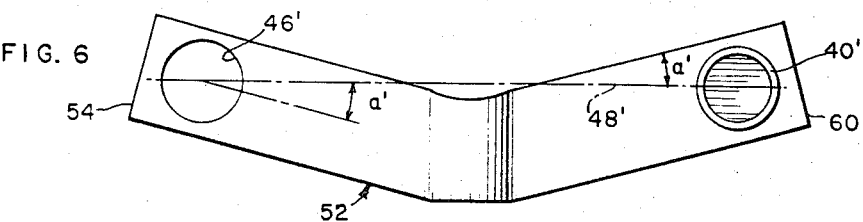

The crossover device in accordance with this embodiment of the present invention is mounted immediately adjacent the faucet fixture and is supported upon the sink or other receptacle 35 on the same side thereof as the faucet fixture, that is, above and to the rear of the sink. The crossover device includes a base provided with a pair of fluid passages crossing laterally between fluid supply means and oppositely positioned inlet openings of the faucet fixture. In accordance with a first embodiment of the invention, the base of the crossover device comprises a pair of flat, stacked, lateral arms, each being recessed to form a fluid passage. One of these arms is illustrated in FIGS. 3 and 4. This arm, 38, is a box-like rectangular enclosure extending substantially laterally a distance approximately equivalent to the lateral dimension of the faucet fixture. Arm 38 is hollow and is provided with a vertical conduit 40 for communicating with the hollow interior of the arm. Conduit 40 is threaded at its lower end so it may be connected to a water main in the conventional manner.

Figure 2:
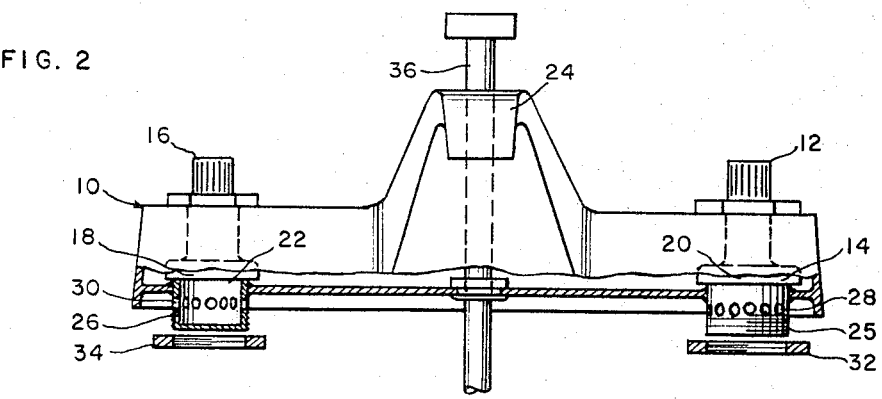
FIG. 2 is a cross-sectional view of a faucet fixture adapted for connection with the crossover faucet device of the present invention.

The opposite end 58 of arm 38 has a circular opening 44 on the upper side thereof and a similar aligned opening 46 on the underside thereof for tightly receiving the perforated conduit 25 shown in FIGS. 1 and 2. When arm 38 is in position, as illustrated in FIG. 1, conduit 40 is substantially vertically aligned with inlet opening conduit 26 of the faucet fixture, but communicates with the opposite inlet opening conduit 25 via the holes 28. Conduit 40 forms one of the inlet ports of the combined device in accordance with the present invention.

Arm 38 extends sideways at a small angle $a$ from a line 48 between the said inlet port and the inlet opening of the faucet fixture, as further illustrated in FIG. 4. The arm 38 extends in this direction to an area approximately halfway between inlet port and inlet opening. The arm 38 is also offset in the vertical direction as shown at 50 in FIG. 3. The arm takes this path in order to accommodate second arm 52 further illustrated in FIGS. 5 and 6.

As shown in FIG. 1, arm 52 extends from the remaining inlet opening 22 to a conduit 40' providing a second inlet port for the device, conduit 40' being substantially aligned with faucet fixture inlet opening 20 and conduit 25. Arm 52 has substantially the same construction as arm 38 and primed reference numerals refer to the corresponding elements in FIGS. 3 and 4. Arm 52 makes an angle $a'$ with a line 48', between inlet openings, similar to angle $a$. Therefore, each arm extends from an inlet port of the crossover device, then past and above the other arm, toward the oppositely positioned inlet opening of the faucet fixture. End 54 of arm 52 is supported upon end 56 of arm 38. Likewise end 58 of arm 38 rests upon end 60 of arm 52. The arms are preferably separated horizontally from one another half way along their lengths to provide room for the passage of the drain plug actuating rod 36 illustrated in FIG. 1 and in FIG. 7 illustrating the arms in assembled relation.

Nuts 32 and 34 respectively secure the arms 38 and 52 to the underside of faucet fixture 10, as can be seen in FIG. 1. In the assembled device, holes 28 in conduit 25 communicate to the interior of arm 38, while holes 30 in conduit 26 communicate to the interior of arm 52 completing the fluid connection between the respective arms and inlet openings of the faucet fixture. Openings 44, 46, 44' and 46' are preferably slightly undersized in order to provide a tight fit between conduits 25 and 26 and the respective arms when the arms are tightened in position by means of nuts 32 and 34. The arms may also be brazed to conduits 25 and 26 at this point for making sure the reverse fluid connection in accordance with the present invention is fluid tight.

In a second embodiment as illustrated in FIGS. 8 and 9, a crossover device in accordance with the present invention comprises a base 62 immediately adjacent to and in supporting relation to faucet fixture 10'. Base 62 is in turn supported upon a sink or other receptacle 63. The base 62 is substantially integral with faucet fixture 10' forming a unitary body, including passages extending from inlet ports 64 and 66 to inlet openings 68 and 70 respectively of faucet fixture 10'. The passages cross one another in a side by side relation internally of base 62 so as to reverse the liquid supply to the faucet fixture.

The inlet ports 64 and 66 conveniently comprise conduits adapted or threaded for conventional connection to a source of liquid supply, and are soldered, brazed, or otherwise connected to the base 62. Inlet openings 68 and 70 of faucet fixture 10' also are convenient conduit connections extending from the underside of the faucet fixture 10' and are similarly soldered, brazed, or otherwise connected to base 62.

The base 62 body, according to this embodiment, includes substantially cylindrical openings 72 and 74 preferably aligned with inlet openings 70 and 68, and inlet ports 64 and 66 respectively. A wall means 76 extends across cylindrical opening 72 dividing cylindrical opening 72 into an upper chamber 80 and a lower chamber 82. A similar wall means 78 divides cylindrical opening 74 into an upper chamber 84 and a lower chamber 86. The interior of the body of base 62 between the cylindrical openings is provided with a front recess 88 and a back recess 90. Vertical wall 92 separates these recesses, this vertical wall having a vertical bore 94 that receives drain plug actuating rod 36. The recesses 88 and 90 extend in side by side relations within the base 62 and are preferably open on top whereby the underside of faucet fixture 10' can provide a top closure for the crossover device. In this manner the interior of the base is conveniently accessible for manufacturing purposes.

Sealing means may be placed between the top 96 of base 62 and the underside of faucet fixture 10'. For example, a gasket is secured at the top 96 of base 62 while the faucet fixture and crossover device are suitably clamped together. Alternatively the base and faucet fixture 10' may be brazed, soldered or otherwise joined together in integral relation. Base 62 may be die cast in one piece.

To complete the device in accordance with this embodiment, passages are drilled between cylindrical openings 80 and 84 and the respective recesses 88 and 90. A first passage 98 extends between upper chamber 84 and the front recess 88. A second passage 100 extends from lower chamber 86 to rear recess 90. A third passage 102 communicates between lower chamber 82 and front recess 88, while a fourth passage 104 is provided from upper chamber 80 to rear recess 90. These passages complete a fluid flow path from each of the respective inlet ports to the oppositely located inlet openings of the faucet fixture thereby reversing the fluid connection therebetween.

While the embodiment of FIGS. 8 and 9 is convenient and economical from the standpoint of fabrication, it is understood that the side by side passages within a unitary base 62 may take various other configurations in passing from each inlet port to the oppositely located inlet opening.

In the usual installation, a pair of hot and cold water supply lines will extend upwardly toward a faucet fixture on the wrong side, that is, with the cold water line on the left and the hot water line on the right-hand side of the fixture. With the present crossover device, the relative positions of the hot and cold water lines will be reversed. Specifically, cold water will enter a left-hand inlet port and flow through the crossover device to an inlet opening on the right-hand side of the faucet fixture. Similarly, hot water will flow into the inlet port on the right-hand side of the crossover device and thence into the left-hand inlet opening of the faucet fixture. Thus the accepted positioning of the cold water and hot water valve handles can be achieved even though the supply lines approach the fixture in the wrong side. This result is achieved in a unitary crossover device substantially integral with the faucet fixture and providing a base therefor. Consequently, no additional installation plumbing need be accomplished beyond what is required in installing the usual faucet fixture.

In the present application the term "sink" is understood to mean sink, lavatory, washbasin or any other receptacle with which a faucet fixture is conventionally employed.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A crossover device for mounting above a sink comprising a faucet fixture having an outlet nozzle and a pair of laterally spaced water inlet openings on the underside thereof adapted for connection respectively to sources of hot and cold water supply, and a base for said faucet fixture immediately adjacent and under said faucet fixture being supportable by a sink on the same side of the sink as said faucet fixture, said base including a pair of fluid passages and water inlet ports wherein said inlet ports are respectively below the inlet openings of said faucet fixture, each of said passages extending and providing a fluid connection from one of said openings of said faucet fixture to the inlet port of said base below the opposite opening of said faucet fixture, with each said passage being connected at one end to said one of said openings of said faucet fixture and at the other end to the inlet port of said base below the opposite opening of said faucet fixture, such that fluid flowing into a port of said base is supplied to the opposite inlet opening of said faucet fixture to reverse the apparent source of fluid supply.

2. A crossover device for mounting upon a sink in conjunction with a faucet fixture having a pair of laterally spaced water inlet openings on the underside thereof adapted for supplying hot and cold water, comprising a base for said faucet fixture immediately adjacent and under said faucet fixture being supportable by said sink on the same side of the sink as said faucet fixture, said base including therewithin a pair of fluid passages and a pair of laterally spaced fluid inlet ports wherein said fluid passages each extend from one of said openings to one of said inlet ports and cross over one another in so doing to reverse the apparent source of fluid supply.

3. The device according to claim 2 wherein said base comprises a pair of flat, stacked, lateral arms mutually supporting each other and supporting said faucet fixture, each being recessed to provide one of said passages, wherein each of said lateral arms extends from an inlet port then past and above the other lateral arm, toward an oppositely located inlet opening of said faucet fixture, each arm having a substantially flat cross section with a greater lateral dimension than the dimension in the direction of stacking, and each arm being supported upon the flat surface of the other arm after each such arm extends above the other arm.

4. The device according to claim 3 wherein each of said lateral arms extends from an inlet port outwardly at a small angle with respect to a line between said inlet ports to an area between said ports where said arms cross over, then back towards an oppositely located inlet opening, each of said arms having an offset in the vertical direction in such area where said arms cross over so as to provide cross connected coupling between said inlet ports and said inlet openings, with each lateral arm on the inlet port side of said offset supporting the other arm thereabove, each said inlet port comprising a substantially vertical threaded conduit extending downwardly from an arm for mounting through a horizontal surface, and each arm being provided with an opening for communicating with an inlet opening of the faucet fixture.

5. The device according to claim 4 wherein said arms are horizontally spaced one from the other in the area where said arms cross over to provide for passage of a drain plug actuating rod extending between said arms from said faucet fixture.

6. The device according to claim 2 wherein said base is a unitary body immediately adjacent and in supporting relation to said faucet fixture and substantially integral therewith including said passages extending from said inlet ports to said inlet openings respectively, wherein said passages are interior to said body and cross one another in substantially side by side relation.

7. The device according to claim 6 wherein said body includes two substantially cylindrical openings at either side of said body aligned with said inlet openings of said faucet fixture and including said inlet ports, wall means extending across said cylindrical openings between said inlet openings of said faucet fixture and said inlet ports separating each of said cylindrical openings into upper and lower chambers, said body also having a pair of recesses including a front recess and a back recess extending between said cylindrical openings with a substantially vertical wall separating said recesses from one another and from said cylindrical openings, said body further including a passage between an upper chamber of a first cylindrical opening and said back recess, a passage between the lower chamber of said first cylindrical openings and said front recess, and a passage between the upper chamber of said chamber of said other of said cylindrical openings and said front recess.

8. The device according to claim 7 wherein said wall separating said front and back recesses includes a vertical bore for receiving a drain plug actuating rod extending from said faucet fixture.

9. The device according to claim 7 wherein said front and back recesses in said body are open towards said faucet fixture so that said faucet fixture provides a top wall for said recesses in an assembled position,
and sealing means between said body and said faucet fixture to insure a fluid-tight closure at the top of said body.

References Cited
UNITED STATES PATENTS

| | | | |
|---|---|---|---|
| 1,762,619 | 6/1930 | Fleming | 4—167 |
| 1,935,971 | 11/1933 | Woesthoff | 137—606 X |
| 2,538,835 | 1/1951 | Harvey et al. | 137—604 X |
| 2,581,855 | 1/1952 | Griffith | 137—606 X |
| 3,307,205 | 3/1967 | Moeschler | 4—192 |
| 3,349,797 | 10/1967 | Parr | 137—594 |

WILLIAM F. O'DEA, *Primary Examiner.*

D. H. LAMBERT, *Assistant Examiner.*

U.S. Cl. X.R.

4—192

UNITED STATES PATENT OFFICE
CERTIFICATE OF CORRECTION

Patent No. 3,416,568            December 17, 1968

Albert W. Parr

It is certified that error appears in the above identified patent and that said Letters Patent are hereby corrected as shown below:

Column 1, line 12, "therewith" should read -- therewithin --. Column 4, line 18, "to" should read -- with --; line 60, "relations" should read -- relation --. Column 6, between lines 67 and 68 insert -- a passage between the lower chamber of the other of said cylindrical openings and said back recess, --. Column 7, line 11, "Woesthoff" should read -- Wuesthoff --.

Signed and sealed this 17th day of March 1970.

(SEAL)
Attest:

Edward M. Fletcher, Jr.            WILLIAM E. SCHUYLER, JR.
Attesting Officer            Commissioner of Patents